(12) United States Patent
Hazenbroek

(10) Patent No.: US 8,757,354 B2
(45) Date of Patent: Jun. 24, 2014

(54) TURNING BLOCK ALIGNMENT

(71) Applicant: Foodmate B.V., Oud-Beijerland (NL)

(72) Inventor: Jacobus Eliza Hazenbroek, Oud-Beijerland (NL)

(73) Assignee: Foodmate BV (NL)

( * ) Notice: Subject to any disclaimer, the term of this patent is extended or adjusted under 35 U.S.C. 154(b) by 0 days.

(21) Appl. No.: 13/655,945

(22) Filed: Oct. 19, 2012

(65) Prior Publication Data

US 2013/0037380 A1 Feb. 14, 2013

Related U.S. Application Data

(63) Continuation-in-part of application No. 13/011,056, filed on Jan. 21, 2011, and a continuation of application No. PCT/NL2011/050268, filed on Apr. 19, 2011.

(30) Foreign Application Priority Data

Apr. 19, 2010 (NL) ...................................... 2004573
Jan. 26, 2011 (NL) ...................................... 2006075

(51) Int. Cl.
*B65G 47/244* (2006.01)
*B65G 17/32* (2006.01)

(52) U.S. Cl.
USPC ........ 198/375; 198/682; 198/465.4; 198/679; 198/678.1; 198/377.1

(58) Field of Classification Search
None
See application file for complete search history.

(56) References Cited

U.S. PATENT DOCUMENTS

| | | | |
|---|---|---|---|
| 3,956,794 A | 5/1976 | Verbakel |
| 3,969,790 A | 7/1976 | Smorenburg |
| 3,979,793 A | 9/1976 | Hazenbroek |
| 3,983,601 A | 10/1976 | Verbakel |
| 3,990,128 A | 11/1976 | van Mil |
| 4,034,440 A | 7/1977 | van Mil |
| 4,118,829 A | 10/1978 | Harben, Jr. |

(Continued)

FOREIGN PATENT DOCUMENTS

| | | |
|---|---|---|
| DE | 603 16 104 T2 | 6/2008 |
| EP | 0 444 782 A1 | 9/1991 |
| EP | 0 786 208 A1 | 7/1997 |
| EP | 2 181 841 A1 | 5/2010 |

OTHER PUBLICATIONS

PCT/NL2011/050268—International Search Report and Written Opinion, Sep. 15, 2011, Foodmate B.V.

(Continued)

*Primary Examiner* — Kavel Singh
(74) *Attorney, Agent, or Firm* — Womble Carlyle Sandridge & Rice LLP

(57) ABSTRACT

Conveyor for moving and positioning objects along a conveyor path, the conveyor including:
  a conveyor rail extending through a predefined conveying path;
  at least one carriage having a rotatable article support; and
  a turning block associated with the rotatable article support, to allow rotatable movement of the article support relative to the at least one carriage,
  wherein the conveyor further includes an aligning station for rotating the article support into a predetermined position,
  wherein the turning block has first disk with a first perimeter contour and a second disk with a second perimeter contour, and
  wherein the alignment station has means for engaging the second disk for rotatingly aligning the article support into the predetermined position.

14 Claims, 10 Drawing Sheets

(56) References Cited

U.S. PATENT DOCUMENTS

| | | |
|---|---|---|
| 4,131,973 A | 1/1979 | Verbakel |
| 4,147,012 A | 4/1979 | van Mil |
| 4,153,971 A | 5/1979 | Simonds |
| 4,153,972 A | 5/1979 | Harben et al. |
| 4,178,659 A | 12/1979 | Simonds |
| 4,180,152 A | 12/1979 | Sefcik |
| 4,203,178 A | 5/1980 | Hazenbroek |
| 4,283,813 A | 8/1981 | House |
| 4,292,709 A | 10/1981 | van Mil |
| 4,388,811 A | 6/1983 | Zebarth |
| 4,395,795 A | 8/1983 | Hazenbroek |
| 4,406,037 A | 9/1983 | Hazenbroek |
| 4,418,444 A | 12/1983 | Meyn et al. |
| 4,418,445 A | 12/1983 | Meyn et al. |
| 4,434,526 A | 3/1984 | van Mil |
| 4,439,891 A | 4/1984 | van Mil |
| 4,468,838 A | 9/1984 | Sjostrom et al. |
| 4,510,886 A | 4/1985 | van Mil |
| 4,514,879 A | 5/1985 | Hazenbroek |
| 4,516,290 A | 5/1985 | van Mil |
| 4,524,489 A | 6/1985 | van Mil |
| 4,558,490 A | 12/1985 | Hazenbroek et al. |
| 4,559,672 A | 12/1985 | Hazenbroek et al. |
| 4,567,624 A | 2/1986 | van Mil |
| 4,570,295 A | 2/1986 | van Mil |
| 4,574,429 A | 3/1986 | Hazenbroek |
| 4,577,368 A | 3/1986 | Hazenbroek |
| D283,289 S | 4/1986 | Hazenbroek |
| 4,593,432 A | 6/1986 | Hazenbroek |
| 4,597,133 A | 7/1986 | van de Nieuwelaar |
| 4,597,136 A | 7/1986 | Hazenbroek |
| 4,635,317 A | 1/1987 | van der Eerden |
| 4,639,973 A | 2/1987 | van der Eerden |
| 4,639,974 A | 2/1987 | Olson |
| 4,639,975 A | 2/1987 | van der Eerden |
| 4,646,384 A | 3/1987 | van der Eerden |
| 4,651,383 A | 3/1987 | van der Eerden |
| 4,653,147 A | 3/1987 | van der Eerden |
| 4,682,386 A | 7/1987 | Hazenbroek et al. |
| 4,704,768 A | 11/1987 | Hutting et al. |
| 4,723,339 A | 2/1988 | van de Nieuwelaar et al. |
| 4,724,581 A | 2/1988 | van de Nieuwelaar |
| 4,736,492 A | 4/1988 | Hazenbroek |
| RE32,697 E | 6/1988 | Hazenbroek et al. |
| 4,765,028 A | 8/1988 | van de Nieuwelaar et al. |
| 4,766,644 A | 8/1988 | van den Nieuwelaar et al. |
| 4,769,872 A | 9/1988 | Hazenbroek et al. |
| 4,779,308 A | 10/1988 | van de Nieuwelaar et al. |
| 4,788,749 A | 12/1988 | Hazenbroek et al. |
| 4,811,456 A | 3/1989 | Heuvel |
| 4,811,458 A | 3/1989 | v.d. Nieuwelaar et al. |
| 4,811,462 A | 3/1989 | Meyn |
| 4,813,101 A | 3/1989 | Brakels et al. |
| 4,884,318 A | 12/1989 | Hazenbroek |
| 4,893,378 A | 1/1990 | Hazenbroek |
| 4,894,885 A | 1/1990 | Markert |
| 4,896,399 A | 1/1990 | Hazenbroek |
| 4,899,421 A | 2/1990 | Van Der Eerden |
| 4,918,787 A | 4/1990 | Hazenbroek |
| 4,928,351 A | 5/1990 | van den Nieuwelaar et al. |
| 4,935,990 A | 6/1990 | Linnenbank |
| 4,939,813 A | 7/1990 | Hazenbroek |
| 4,958,694 A | 9/1990 | van den Nieuwelaar et al. |
| 4,965,908 A | 10/1990 | Meyn |
| 4,972,549 A | 11/1990 | van den Nieuwelaar et al. |
| 4,993,113 A | 2/1991 | Hazenbroek |
| 4,993,115 A | 2/1991 | Hazenbroek |
| 5,001,812 A | 3/1991 | Hazenbroek |
| 5,013,431 A | 5/1991 | Doets |
| 5,015,213 A | 5/1991 | Hazenbroek |
| 5,019,013 A | 5/1991 | Hazenbroek |
| 5,026,983 A | 6/1991 | Meyn |
| 5,035,673 A | 7/1991 | Hazenbroek |
| 5,037,351 A | 8/1991 | van Den Nieuwelaar et al. |
| 5,041,054 A | 8/1991 | van den Nieuwelaar et al. |
| 5,045,022 A | 9/1991 | Hazenbroek |
| 5,060,596 A | 10/1991 | Esbroeck |
| 5,064,402 A | 11/1991 | Koops |
| 5,067,927 A | 11/1991 | Hazenbroek et al. |
| 5,069,652 A | 12/1991 | Hazenbroek |
| 5,074,823 A | 12/1991 | Meyn |
| 5,088,959 A | 2/1992 | Heemskerk |
| 5,090,940 A | 2/1992 | Adkison |
| 5,098,333 A | 3/1992 | Cobb |
| 5,104,351 A | 4/1992 | van den Nieuwelaar et al. |
| 5,122,090 A | 6/1992 | van de Nieuwelaar et al. |
| 5,123,871 A | 6/1992 | van den Nieuwelaar et al. |
| 5,125,498 A | 6/1992 | Meyn |
| 5,147,240 A | 9/1992 | Hazenbroek et al. |
| 5,147,241 A | 9/1992 | Rudin |
| 5,154,664 A | 10/1992 | Hazenbroek et al. |
| 5,154,665 A | 10/1992 | Hazenbroek |
| RE34,149 E | 12/1992 | Markert |
| 5,173,076 A | 12/1992 | Hazenbroek |
| 5,173,077 A | 12/1992 | van den Nieuwelaar et al. |
| 5,176,563 A | 1/1993 | van den Nieuwelaar et al. |
| 5,176,564 A | 1/1993 | Hazenbroek |
| 5,178,890 A | 1/1993 | van den Nieuwelaar et al. |
| 5,186,679 A | 2/1993 | Meyn |
| 5,188,559 A | 2/1993 | Hazenbroek |
| 5,188,560 A | 2/1993 | Hazenbroek |
| 5,194,035 A | 3/1993 | Dillard |
| 5,197,917 A | 3/1993 | Verbakel et al. |
| 5,199,922 A | 4/1993 | Korenberg et al. |
| 5,222,905 A | 6/1993 | Van den Nieuwelaar et al. |
| 5,242,324 A | 9/1993 | Koops |
| 5,248,277 A | 9/1993 | Bos et al. |
| 5,256,101 A | 10/1993 | Koops |
| 5,269,721 A | 12/1993 | Meyn |
| 5,277,649 A | 1/1994 | Adkison |
| 5,277,650 A | 1/1994 | Meyn |
| 5,279,517 A | 1/1994 | Koops |
| 5,290,187 A | 3/1994 | Meyn |
| 5,299,975 A | 4/1994 | Meyn |
| 5,299,976 A | 4/1994 | Meyn |
| 5,318,428 A | 6/1994 | Meyn |
| 5,326,311 A | 7/1994 | Persoon et al. |
| 5,334,083 A | 8/1994 | van den Nieuwelaar et al. |
| 5,336,127 A | 8/1994 | Hazenbroek |
| 5,340,351 A | 8/1994 | Minderman et al. |
| 5,340,355 A | 8/1994 | Meyn |
| 5,342,237 A | 8/1994 | Kolkman |
| 5,344,359 A | 9/1994 | Kolkman |
| 5,344,360 A | 9/1994 | Hazenbroek |
| 5,366,406 A | 11/1994 | Hobbel et al. |
| 5,370,574 A | 12/1994 | Meyn |
| 5,372,246 A | 12/1994 | van Aalst |
| RE34,882 E | 3/1995 | Meyn |
| 5,429,549 A | 7/1995 | Verrijp et al. |
| 5,439,702 A | 8/1995 | French |
| 5,453,045 A | 9/1995 | Hobbel et al. |
| 5,462,477 A | 10/1995 | Ketels |
| 5,470,194 A | 11/1995 | Zegers |
| 5,487,700 A | 1/1996 | Dillard |
| 5,505,657 A | 4/1996 | Janssen et al. |
| 5,549,521 A | 8/1996 | van den Nieuwelaar et al. |
| D373,883 S | 9/1996 | Dillard |
| 5,569,067 A | 10/1996 | Meyn |
| 5,595,066 A | 1/1997 | Zwanikken et al. |
| 5,605,503 A | 2/1997 | Martin |
| 5,643,072 A | 7/1997 | Lankhaar et al. |
| 5,643,074 A | 7/1997 | Linnenbank |
| 5,672,098 A | 9/1997 | Veraart |
| 5,676,594 A | 10/1997 | Joosten |
| 5,704,830 A | 1/1998 | Van Ochten |
| 5,713,786 A | 2/1998 | Kikstra |
| 5,713,787 A | 2/1998 | Schoenmakers et al. |
| 5,741,176 A | 4/1998 | Lapp et al. |
| 5,755,617 A | 5/1998 | van Harskamp et al. |
| 5,759,095 A | 6/1998 | De Weerd |
| 5,766,063 A | 6/1998 | Hazenbroek et al. |
| 5,782,685 A | 7/1998 | Hazenbroek et al. |
| 5,785,588 A | 7/1998 | Jacobs et al. |
| 5,803,802 A | 9/1998 | Jansen |

(56) References Cited

U.S. PATENT DOCUMENTS

| | | |
|---|---|---|
| 5,810,651 A | 9/1998 | De Heer et al. |
| 5,810,653 A | 9/1998 | Van Craaikamp et al. |
| 5,813,908 A | 9/1998 | Craaikamp |
| 5,827,116 A | 10/1998 | Al et al. |
| 5,833,527 A | 11/1998 | Hazenbroek et al. |
| 5,865,672 A | 2/1999 | Hazenbroek |
| 5,875,738 A | 3/1999 | Hazenbroek et al. |
| 5,947,811 A | 9/1999 | Hazenbroek et al. |
| 5,951,393 A | 9/1999 | Barendregt |
| 5,975,029 A | 11/1999 | Morimoto et al. |
| 5,976,004 A | 11/1999 | Hazenbroek |
| 5,980,377 A | 11/1999 | Zwanikken et al. |
| 6,007,416 A | 12/1999 | Janssen et al. |
| 6,007,417 A | 12/1999 | Jones et al. |
| 6,024,636 A | 2/2000 | Hazenbroek et al. |
| 6,027,403 A | 2/2000 | Hazenbroek et al. |
| 6,027,404 A | 2/2000 | Wols |
| 6,029,795 A | 2/2000 | Janssen et al. |
| 6,062,972 A | 5/2000 | Visser |
| 6,095,914 A | 8/2000 | Cornelissen et al. |
| 6,126,534 A | 10/2000 | Jacobs et al. |
| 6,132,304 A | 10/2000 | Aarts et al. |
| 6,142,863 A | 11/2000 | Janssen et al. |
| 6,152,816 A | 11/2000 | van den Nieuwelaar et al. |
| 6,176,772 B1 | 1/2001 | Hazenbroek et al. |
| 6,179,702 B1 | 1/2001 | Hazenbroek |
| 6,190,250 B1 | 2/2001 | Volk et al. |
| 6,193,595 B1 | 2/2001 | Volk et al. |
| 6,220,953 B1 | 4/2001 | Cornelissen et al. |
| 6,231,436 B1 | 5/2001 | Bakker |
| 6,254,471 B1 | 7/2001 | Meyn |
| 6,254,472 B1 | 7/2001 | Meyn |
| 6,277,021 B1 | 8/2001 | Meyn |
| 6,299,524 B1 | 10/2001 | Janssen et al. |
| 6,306,026 B1 | 10/2001 | Post |
| 6,322,438 B1 | 11/2001 | Barendregt |
| 6,358,136 B1 | 3/2002 | Volk et al. |
| 6,371,843 B1 | 4/2002 | Volk et al. |
| 6,375,560 B1 | 4/2002 | Verrijp |
| 6,383,069 B1 | 5/2002 | Volk et al. |
| 6,398,636 B1 | 6/2002 | Jansen et al. |
| 6,446,352 B2 | 9/2002 | Middelkoop et al. |
| 6,478,668 B2 | 11/2002 | Visser et al. |
| 6,599,179 B1 | 7/2003 | Hazenbroek et al. |
| 6,612,919 B2 | 9/2003 | Jansen et al. |
| 6,656,032 B2 | 12/2003 | Hazenbroek et al. |
| 6,726,556 B2 | 4/2004 | Gooren et al. |
| 6,736,717 B1 | 5/2004 | Annema et al. |
| 6,764,393 B1 * | 7/2004 | Hazenbroek et al. ......... 452/188 |
| 6,783,451 B2 | 8/2004 | Aandewiel et al. |
| 6,811,478 B2 | 11/2004 | van den Nieuwelaar et al. |
| 6,811,480 B2 | 11/2004 | Moriarty |
| 6,811,802 B2 | 11/2004 | van Esbroeck et al. |
| 6,830,508 B2 | 12/2004 | Hazenbroek et al. |
| 6,837,782 B2 | 1/2005 | Hetterscheid et al. |
| 6,899,613 B2 | 5/2005 | van den Nieuwelaar et al. |
| 6,912,434 B2 | 6/2005 | van den Nieuwelaar et al. |
| 6,986,707 B2 | 1/2006 | van Den Nieuwelaar et al. |
| 7,018,283 B2 | 3/2006 | Schmidt et al. |
| 7,029,387 B2 | 4/2006 | van den Nieuwelaar et al. |
| 7,059,954 B2 | 6/2006 | Annema et al. |
| 7,063,611 B2 | 6/2006 | Nolten et al. |
| 7,066,806 B2 | 6/2006 | de Heer et al. |
| 7,070,493 B2 | 7/2006 | Hazenbroek et al. |
| 7,115,030 B2 | 10/2006 | van Hillo et al. |
| 7,125,330 B2 | 10/2006 | Beeksma et al. |
| 7,128,937 B2 | 10/2006 | van den Nieuwelaar et al. |
| 7,133,742 B2 | 11/2006 | Cruysen et al. |
| 7,172,781 B2 | 2/2007 | Kish |
| 7,232,365 B2 | 6/2007 | Annema et al. |
| 7,232,366 B2 | 6/2007 | van Den Nieuwelaar et al. |
| 7,249,998 B2 | 7/2007 | van Esbroeck et al. |
| 7,261,629 B2 | 8/2007 | Holleman |
| 7,284,973 B2 | 10/2007 | van Esbroeck et al. |
| 7,302,885 B2 | 12/2007 | Townsend |
| 7,344,437 B2 | 3/2008 | Van Den Nieuwelaar et al. |
| D565,941 S | 4/2008 | Peters et al. |
| 7,357,707 B2 | 4/2008 | de Vos et al. |
| 7,476,148 B2 | 1/2009 | McQuillan et al. |
| 7,494,406 B2 | 2/2009 | Van Esbroeck et al. |
| 7,530,888 B2 | 5/2009 | Annema et al. |
| 7,572,176 B2 | 8/2009 | Petersen et al. |
| 7,662,033 B1 | 2/2010 | Ritter et al. |
| 7,662,034 B2 | 2/2010 | Van Hillo et al. |
| 7,717,773 B2 | 5/2010 | Woodford et al. |
| 7,740,527 B1 | 6/2010 | Harben |
| 7,744,449 B2 | 6/2010 | van Esbroeck et al. |
| 7,824,251 B2 | 11/2010 | van den Nieuwelaar et al. |
| 2001/0023171 A1 | 9/2001 | Hazenbroek et al. |
| 2002/0055328 A1 | 5/2002 | Schmidt et al. |
| 2002/0058470 A1 | 5/2002 | Schmidt et al. |
| 2002/0090905 A1 | 7/2002 | Moriarty |
| 2002/0168930 A1 | 11/2002 | Jansen et al. |
| 2003/0008606 A1 | 1/2003 | Hazenbroek et al. |
| 2003/0084856 A1 | 5/2003 | Hazenbroek et al. |
| 2003/0092372 A1 | 5/2003 | Aandewiel et al. |
| 2004/0198209 A1 | 10/2004 | Hazenbroek et al. |
| 2004/0235409 A1 | 11/2004 | Nolten et al. |
| 2005/0037704 A1 | 2/2005 | Heer et al. |
| 2005/0037705 A1 | 2/2005 | Beeksma et al. |
| 2005/0048894 A1 | 3/2005 | van Hillo et al. |
| 2005/0186897 A1 | 8/2005 | Holleman |
| 2005/0221748 A1 | 10/2005 | Hillo et al. |
| 2006/0099899 A1 | 5/2006 | Hazenbroek et al. |
| 2006/0217051 A1 | 9/2006 | Gerrits |
| 2007/0082595 A1 | 4/2007 | de Vos et al. |
| 2007/0221071 A1 | 9/2007 | Kuijpers et al. |
| 2007/0224306 A1 | 9/2007 | van Esbroeck et al. |
| 2008/0017050 A1 | 1/2008 | van Esbroeck et al. |
| 2008/0125025 A1 | 5/2008 | Van Den Nieuwelaar et al. |
| 2008/0171506 A1 | 7/2008 | Nieuwelaar et al. |
| 2009/0239457 A1 | 9/2009 | Jansen et al. |
| 2009/0320761 A1 | 12/2009 | Grave et al. |
| 2010/0022176 A1 | 1/2010 | Van De Nieuwelaar et al. |
| 2010/0029186 A1 | 2/2010 | Janssen et al. |
| 2010/0048114 A1 | 2/2010 | Van Den Nieuwelaar et al. |
| 2010/0062699 A1 | 3/2010 | Sorensen et al. |
| 2010/0075584 A1 | 3/2010 | Aandewiel et al. |
| 2010/0081366 A1 | 4/2010 | De Vos et al. |
| 2010/0120344 A1 | 5/2010 | Van Den Nieuwelaar et al. |
| 2010/0151779 A1 | 6/2010 | Bakker |
| 2010/0221991 A1 | 9/2010 | Hagendoorn et al. |

OTHER PUBLICATIONS

PCT/NL2011/050268—International Preliminary Report on Patentablity, Oct. 23, 2012, Foodmate B.V.

* cited by examiner

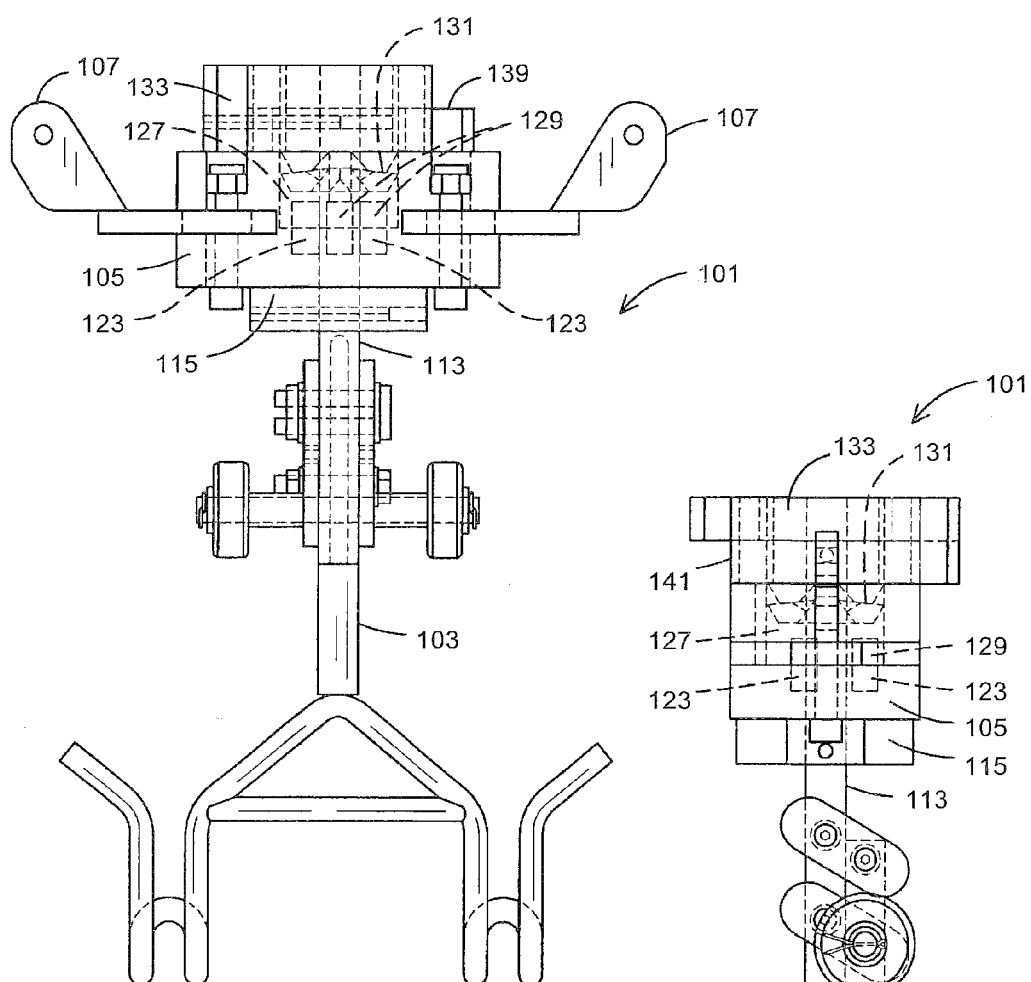
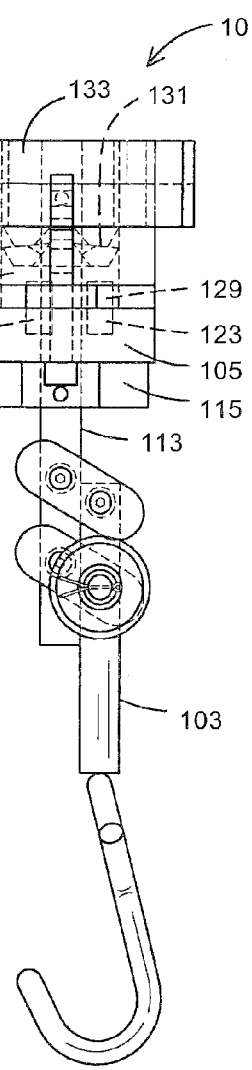
Fig. 9
Fig. 8

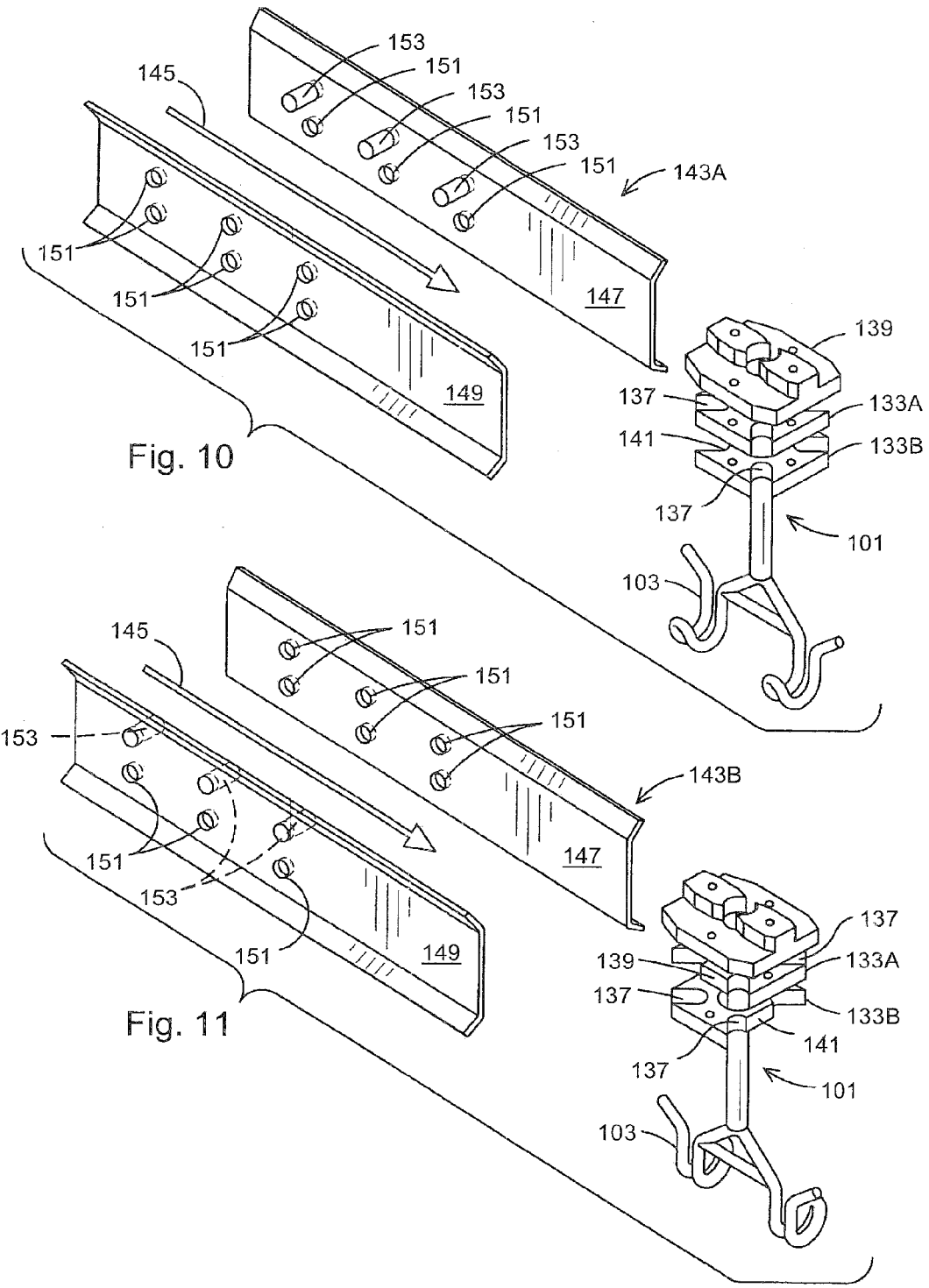

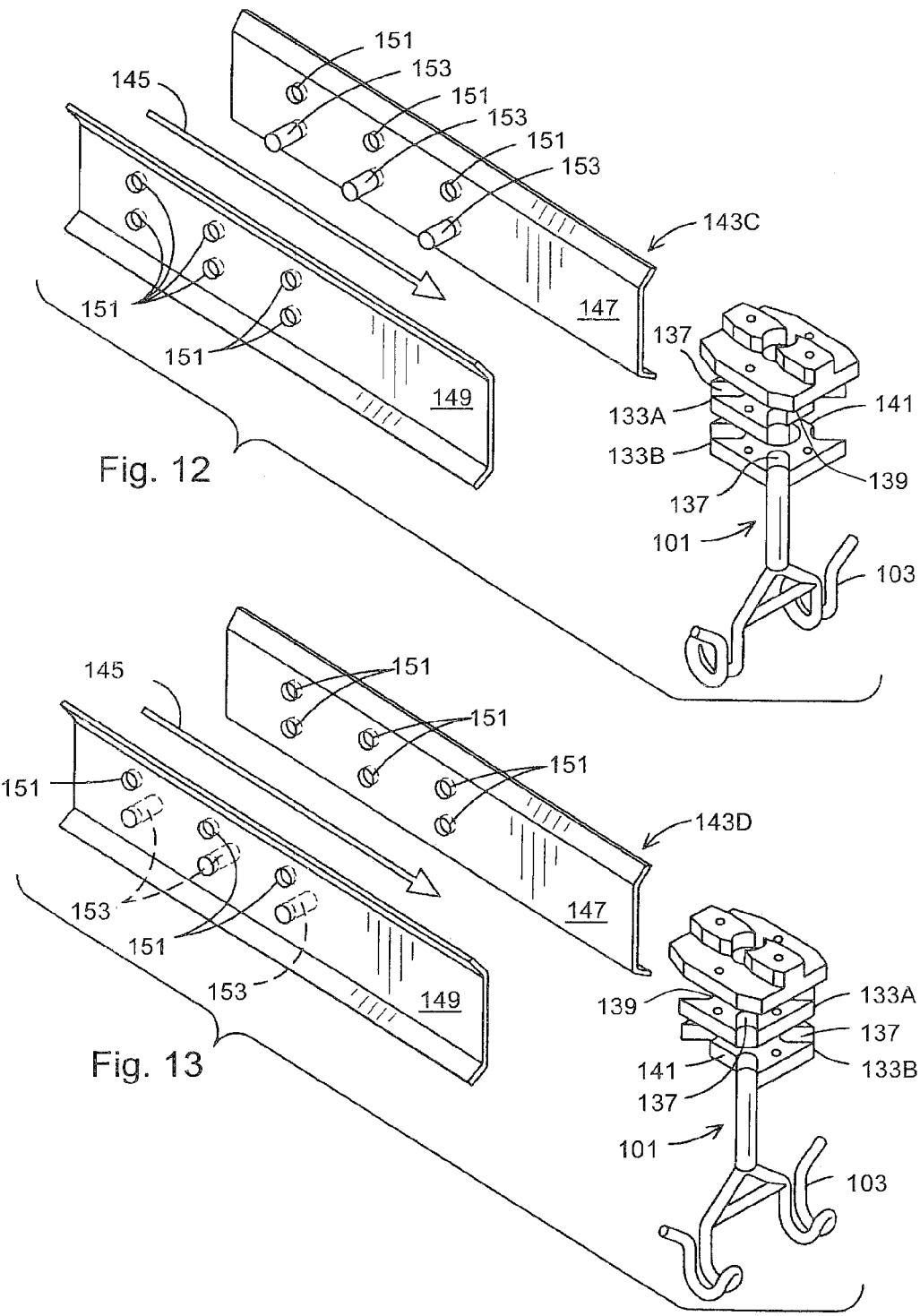

TURNING BLOCK ALIGNMENT

The invention relates to a conveyor having rotatable suspension hangers. In particular the invention is relevant to such rotatable suspension hangers as used in processing lines for slaughtered animals, to suspend the animal carcasses by their legs for movement past subsequent processing stations.

Such suspension hooks are in common use on poultry and fowl processing lines. One suitable example is described in EP 0786208, which discloses a shackle for suspending poultry by their legs for movement by a conveyor track of a poultry processing line along individual processing stations. Thereby a trolley assembly is supported and guided along a conveyor track and moved there along by a transport chain. The poultry suspension hooks are rotatably mounted to the trolley and an associated turning gear is adapted to cooperate with means along the track to rotate the poultry suspension hooks in predetermined rotary positions. At the location of individual processing stations the turning gear is usually retained between opposite parallel side guides to inhibit any rotation when the suspended poultry carcass is processed at an individual processing station. In between the processing stations these parallel side guides may be interrupted. The side guides are also interrupted where the turning gear is engaged by means to effect its rotation. To this end the turning gear, which is a substantially square body, has slots extending inwardly from its corners. These slots are engageable by a turning pin positioned along the conveyor path. A yieldable indexing arrangement between the trolley and the turning gear ensures that the rotary position is retained when moving further along the track. This is of particular importance at locations where the lateral side guides are interrupted.

Usually the yieldable indexing means—such a spring biased ball and socket assembly with opposite cavities and recesses for holding and receiving the ball and spring between the relatively rotatable parts—are effective to keep the turning blocks in their rotated positions between treatment stations. However given the open arrangement of, in particular, poultry processing lines, a risk cannot be excluded that accidental external obstructions in the path of the conveyor may unintentionally alter the rotational position of a turning block in-between treatment stations. Should this occur and remain undetected a wrongly positioned suspension hanger may cause damage to a treatment stations, or at least result in a treated product that is defective.

Accordingly it is an object of the present invention to propose turning block alignment for an overhead conveyor. In a more general sense it is an object of the invention to overcome or ameliorate at least one of the disadvantages of the prior art. It is also an object of the present invention to provide alternative structures which are less cumbersome in assembly and operation and which moreover can be made relatively inexpensively. Alternatively it is an object of the invention to at least provide the public with a useful choice.

To this end the invention provides for a conveyor as defined in one or more of the appended claims. The conveyor according to the invention thus includes a turning block alignment device that may be arranged upstream of a treatment station and thereby protect this treatment station for possible damage or malfunction due to a wrongly positioned suspension hanger.

The invention also provides a conveyor for moving and positioning objects along a conveyor path, the conveyor comprise: a conveyor rail extending along the conveying path; at least one carriage movable along the conveyor rail; an article support rotatably mounted with respect to the carriage; a turning block associated with the article support, rotation of the turning block causing corresponding rotation of the article support; an aligning station in the path of the turning block for rotating the turning block and article support to a predetermined orientation; the turning block having a first disk with a first perimeter contour and a second disk with a second perimeter contour, and the aligning station including features for selectively engaging at least the second disk as the turning block moves through the aligning station to rotate the article support into the predetermined orientation.

Conveyors according to the invention are in particular suitable for moving animal carcasses in spaced sequential relationship along a processing path, when the conveyor comprises at least: an elongated rail extending along the processing path; a plurality of carriages mounted for movement along the rail; a drive member for moving the plurality of carriages along processing path; each carriage including a turning block rotatable between indexed positions with respect to the processing path; a shackle depending from and rotatable with each turning block, each shackle being configured to hold an animal carcass suspended therefrom; an aligning station disposed along the processing path in substantial alignment with the turning blocks of carriages moving along the processing path; and features associated with the aligning station for selectively engaging the turning blocks of carriages moving through the aligning station in such a way that the turning blocks and shackles emerge from the aligning station in a single predetermined orientation regardless of their orientations when entering the aligning station.

The invention also provides for a method of orienting a poultry shackle depending from a conveyor carriage to a predetermined orientation as the poultry shackle moves along a processing path, the method comprising the steps of: (i) moving the conveyor carriage through an aligning station located along the processing path; (ii) if the poultry shackle is in the predetermined orientation upon entering the aligning station, allowing the poultry shackle to pass through the aligning station unaffected to emerge from the aligning station in the predetermined orientation; and (iii) if the poultry shackle is not in the predetermined orientation upon entering the aligning station, rotating the poultry shackle between a predetermined number of indexed orientations within the aligning station until the poultry shackle is oriented in and emerges from the aligning station in the predetermined orientation.

In one advantageous arrangement a conveyor assembly is provided for conveying articles along processing stations including a conveyor in accordance with the invention in combination at least one carriage and associated article support that includes a carriage block or trolley for engagement by the conveyor; a shackle configured to support an article, and rotatable with respect to the carriage block; a turning block associated with the shackle, rotation of the turning block with respect to the carriage block causing corresponding rotation of the shackle relative to the carriage block; and yieldable indexing means operatively arranged between the carriage block and the turning block to define at least a first and a second incremental rotational position for the shackle, in which the yieldable indexing means are biased into engagement by magnetic forces.

Accordingly a conveyor is disclosed for moving and positioning objects along a conveyor path. The conveyor includes a conveyor rail extending along the conveyor path and at least one carriage having a rotatable article support mounted for movement along the conveyor rail. A turning block associated with the rotatable article support facilitates rotatable movement of the article support when the turning block is rotated.

The conveyor further includes an aligning station for rotating the article support into a predetermined position when the turning block passes through the aligning station as the article support moves through the aligning station. The turning may be formed with a first disk with a first perimeter contour and a second disk with a second perimeter contour. The alignment station has projections in the form of pins for engaging the second disk as needed for rotating the turning block and article support between indexed orientations until the article support is oriented in a predetermined desired orientation. The article support may be a poultry shackle for suspending poultry carcasses and moving them along the conveyor path.

Further advantageous aspects of the invention will become clear from the appended claims and from the following description of preferred embodiments.

FIG. 8 is a side elevation in ghost view of the article support of FIGS. 6 and 7;

FIG. 9 is a rear elevation in ghost view of the article support of FIGS. 6, 7 and 8;

FIG. 10 shows a first arrangement of turning pins in relation to a first output position for the article support;

FIG. 11 shows a second arrangement of turning pins in relation to a second output position of the article support;

FIG. 12 shows a third arrangement of turning pins in relation to a third output position for the article support; and FIG. 13 shows a fourth arrangement of turning pins in relation to a fourth output position for the article support.

Figure 1:
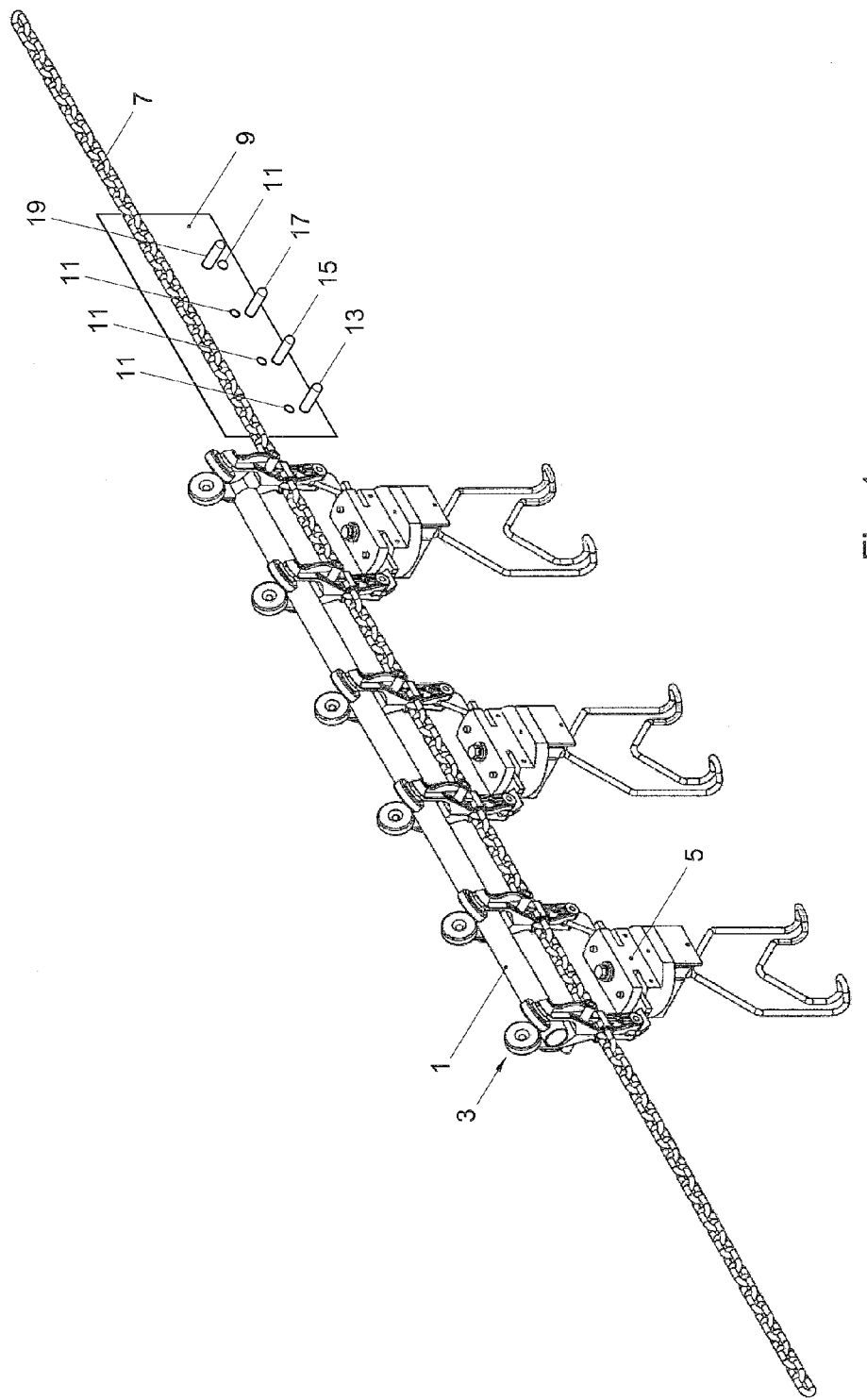
FIG. 1 is a partial perspective view of a conveyor according to the invention.

Referring first to FIG. 1 there is shown a conveyor rail 1 that here takes the form of a pipe or rod. Guided for movement along the rail 1 are pairs of trolleys 3 carrying individual carriages 5. The trolleys 3 are interconnected by a chain 7, which pulls the trolleys 3 and carriages 5 along the rail 1. Positioned along a conveying path defined by the rail 1 is a combined aligning and turning station 9. The aligning and turning station 9 may be provided with rows of openings 11 in two levels, one above the other. The openings 11 may each optionally receive a respective first, second, third or fourth turning pin 13, 15, 17, 19, for a purpose explained herein below.

Figure 2:
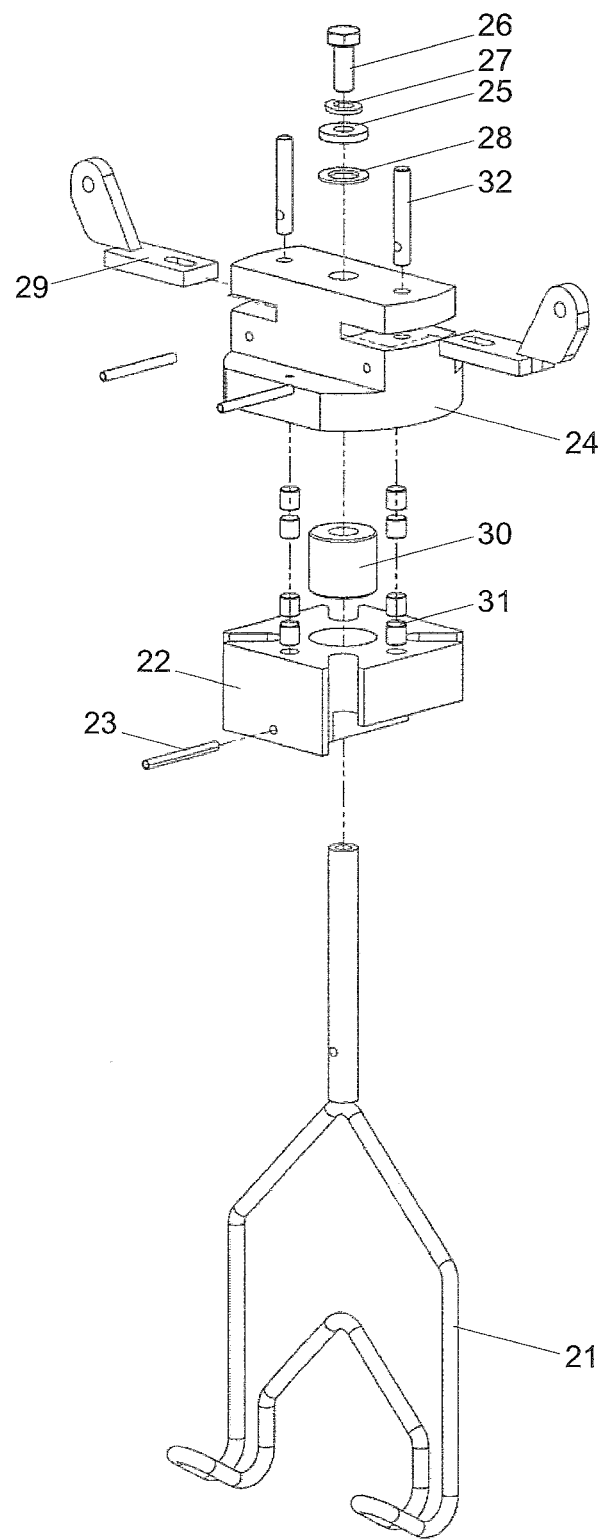
FIG. 2 is an exploded view of a rotatable article support and turning block as used in the conveyor of FIG. 1.

FIG. 2 shows the rotatable article support of the carriage 5 in an exploded arrangement. A suspension shackle 21 is non-rotatably connected to turning block 22. A retention pin 23 is inserted through both the shackle 21 and the turning block 22 to obtain the non-rotatable connection. A carriage block 24 rotatably receives the turning block 22 by means of a bolt 26 and various washers 25, 27 and 28. The bolt 26 thereby engages bushing 30 that affixes to the turning block 22. The carriage block 24 is suspended from the trolleys (only shown in FIG. 1) by trolley brackets 29. Each trolley bracket 29 is secured in a slot in the carriage block 24 and affixed by a respective securing pin 32. The turning block 22 can be retained in indexed positions with respect to the carriage block 24 by indexing means in the form of magnets 31 or equivalent indexing means, such as a ball and spring.

Figure 3:
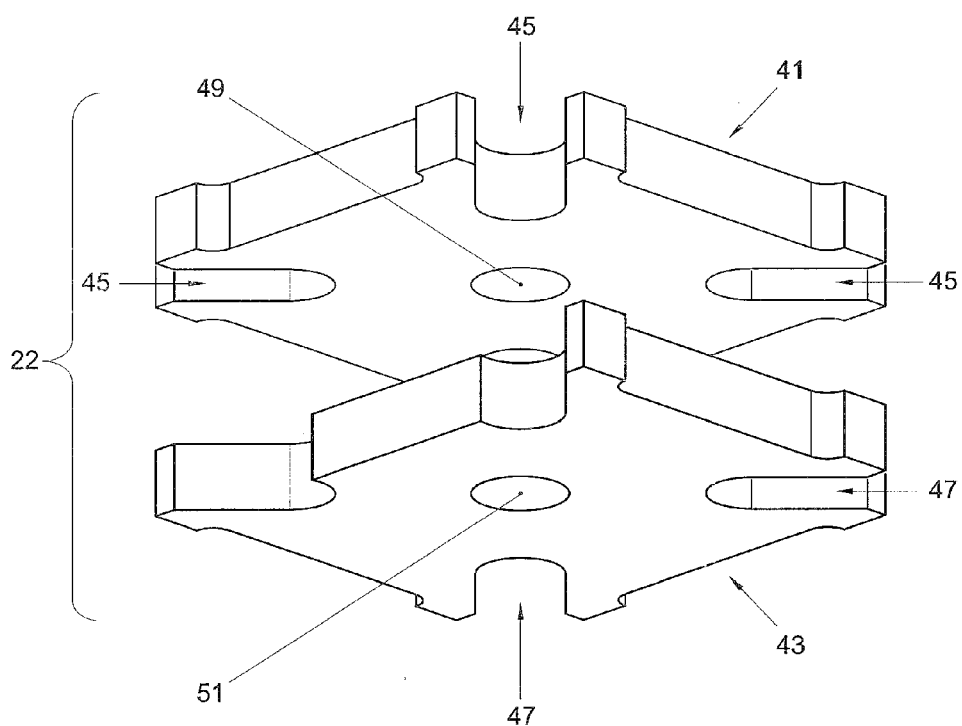
FIG. 3 is an exploded view of a first embodiment of a turning block for use in the rotatable article support of FIG. 2.

In FIG. 3 a possible embodiment of the turning block 22 is shown in an exploded arrangement. The turning block 22 is seen to comprise an upper level disk 41 and a lower level disk 43. The upper level disk 41 has a generally square perimeter, interrupted by four diagonally extending slots 45 opening into the corners of the square perimeter and extending inwardly there from. The lower level disk 43 is similarly shaped to the upper level disk 41, but is substantially shorter on one of its sides and thereby effectively only has two diagonally extending slots 47. The upper and lower level disks 41, 43 each have a respective central bore 49, 51.

Figure 4A:
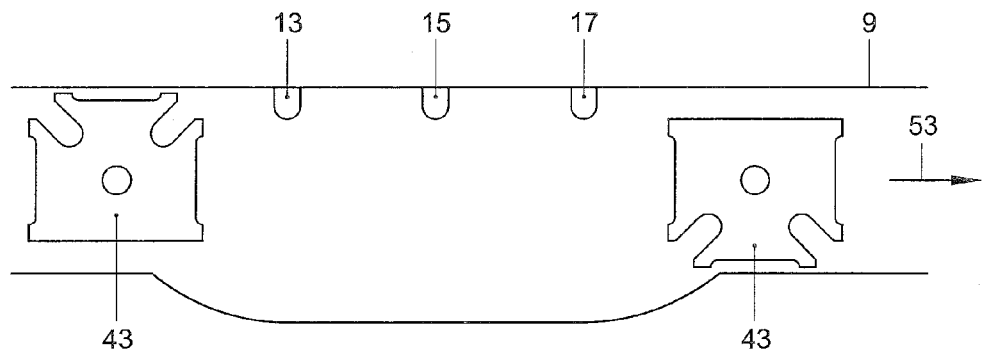
FIGS. 4A-4C are schematic views showing the various options provided by the aligning station.
Figure 4B:
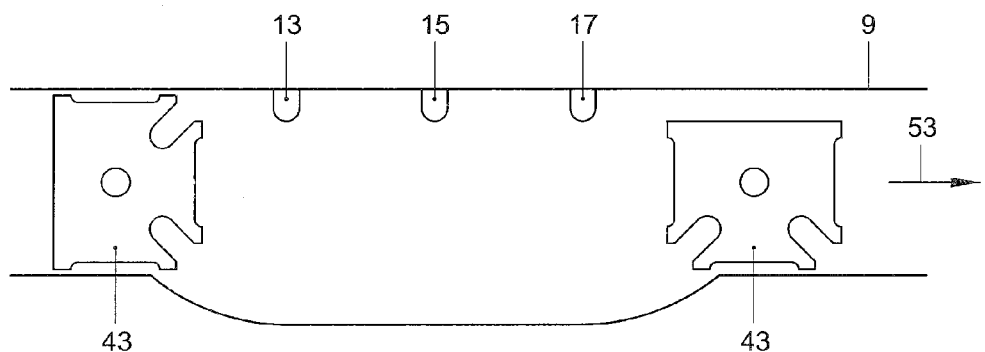
Figure 4C:
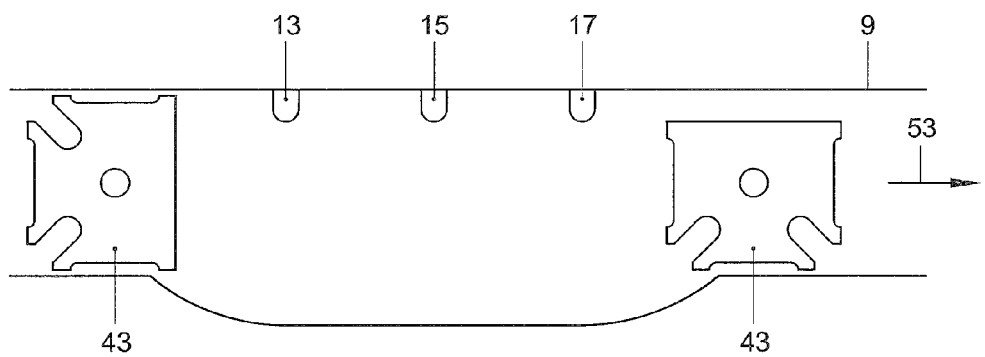

In FIGS. 4A-4C it is schematically shown that the lower level disk 43, irrespective of the rotative position in which it meets the first, second and third turning pins 13, 15, 17 in the direction of conveyance 53, will end up in the predetermined position. As can be seen in either one of the FIGS. 4A, 4B and 4C the position of the lower level disk 43 after passing the first, second and third turning pins 13, 15, 17 is exactly the same. This may be used to correct the rotative positions of the article supports (carriages 5 in FIG. 1 and the shackle 21 of FIG. 2) before these are conveyed towards a treatment station that may be positioned along the path of conveyance or the conveyor.

Figure 5A:
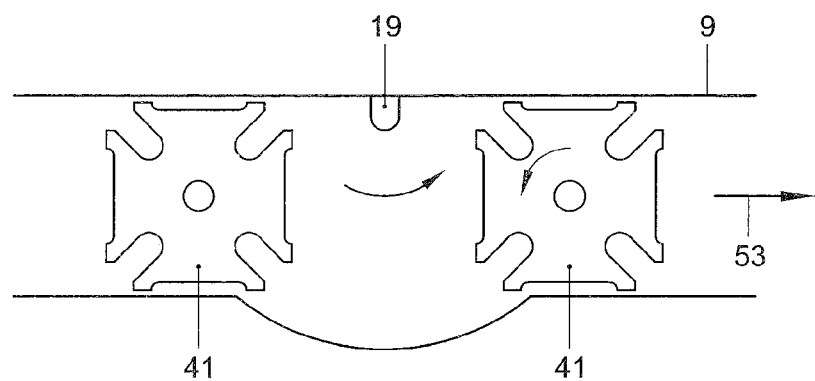
FIGS. 5A-5B are schematic views showing the turning station options for left hand and right hand rotations.
Figure 5B:
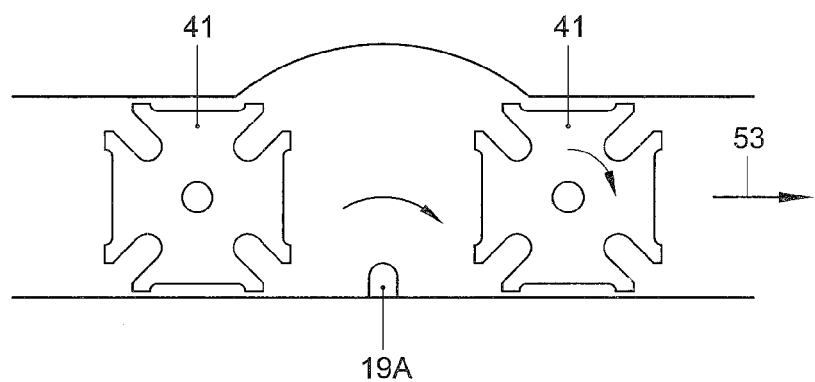

FIGS. 5A and 5B are schematic representations, similar to FIG. 4, but showing the upper level disk 41 being rotated through 90 degree increments. This rotation in increments of 90 degrees can be in a left hand rotational direction by fourth turning pin 19 or alternatively in a right hand rotational direction by a fourth turning pin 19A that extends from an opposite side of the conveying path, as shown in FIG. 5B.

Figure 6:
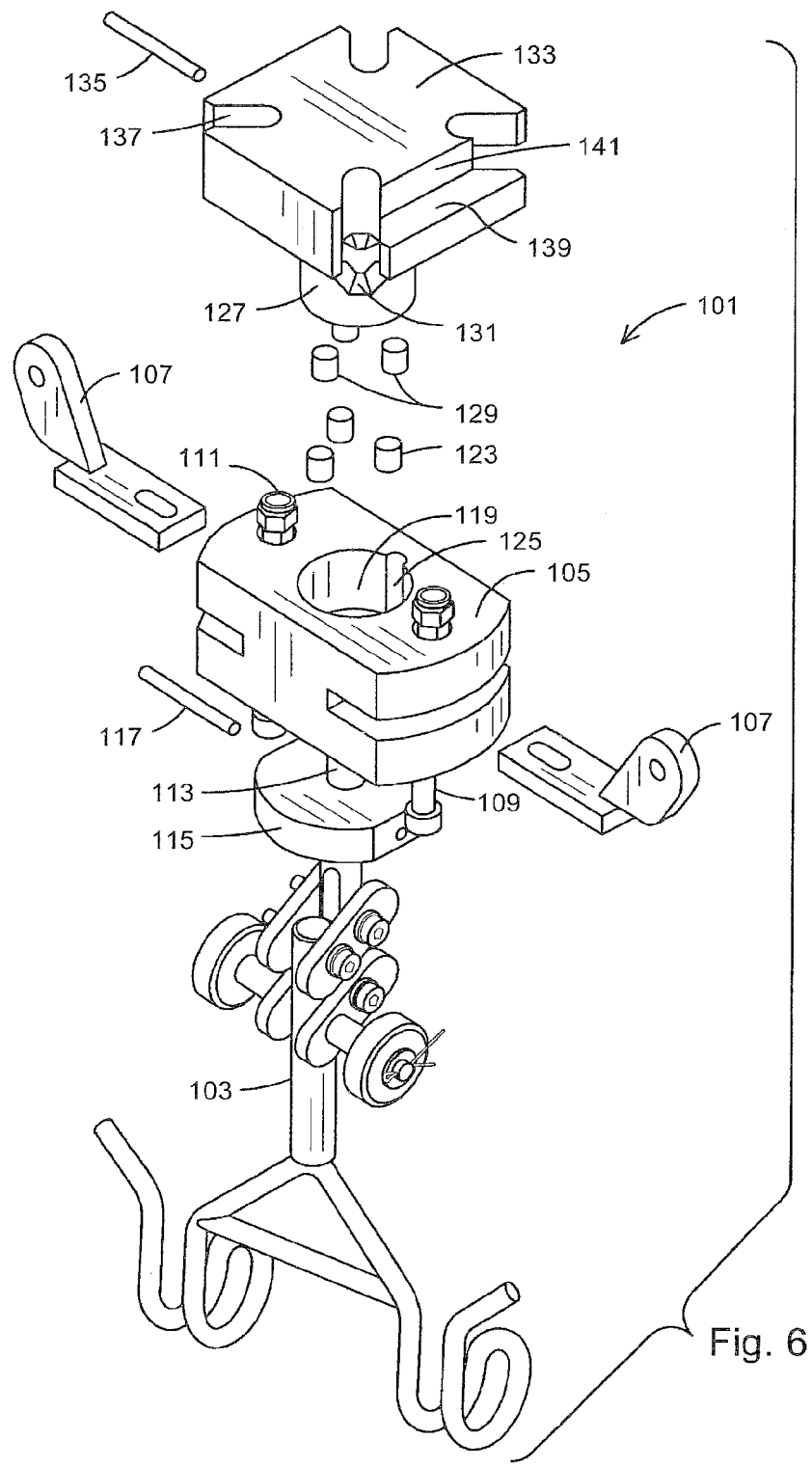
FIG. 6 is an exploded perspective illustration of a rotatable article support.
Figure 7:
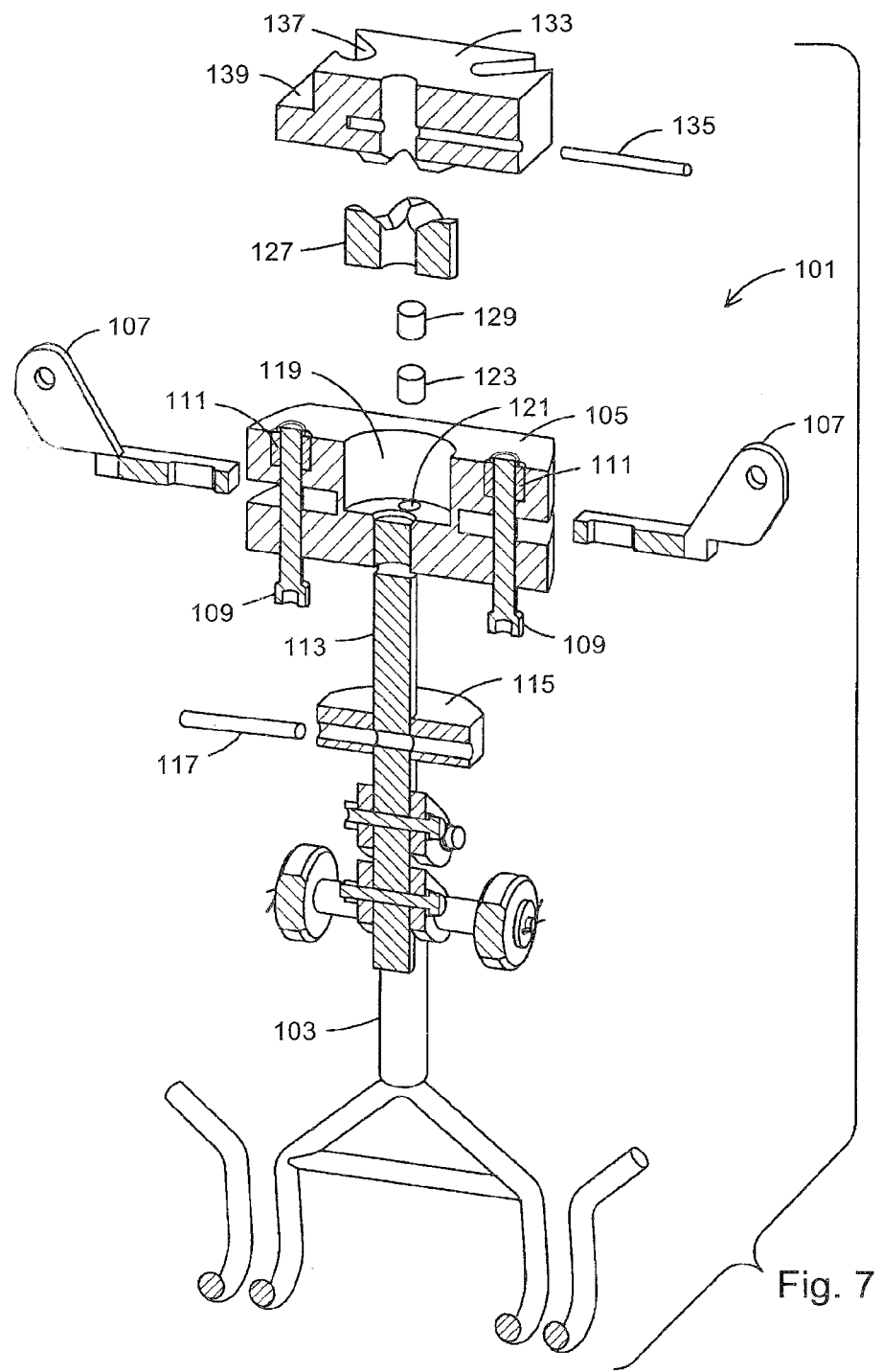
FIG. 7 is a cross section of the exploded perspective illustration of FIG. 6.

In FIG. 6 an exploded arrangement is shown of a rotatable article support assembly 101. The article support assembly 101 is provided with a shackle 103, which in this example is a so called weighing shackle for the suspension of animal carcasses, such as fowl or poultry carcasses. The shackle 103 is rotatably suspended from a carriage block 105. The carriage block 105 is arranged for movement along an overhead conveyor rail or track (not shown, but conventional). Such conveyor rails or tracks are common in industrial apparatuses for carrying out a succession of processing steps. Commonly such conveying tracks are laid out in a continuous loop that defines a path of conveyance along a plurality of processing stations. Such systems are well known in the meat processing industry, but are also used in other disciplines of industry and manufacture. In this regard the carriage block 105 forms a trolley or carriage that is linked to similar carriage blocks of adjacent article support assemblies by trolley brackets 107 and chains, or the like. The trolley brackets 107 are attached to the carriage block 105 by means of bolts 109 and nuts 111. Extending upwardly from shackle 103 is a shaft 113 to which an abutment flange 115 is attached by means of a first transverse pin 117. The shaft 113 extends upwardly through a central bore in the carriage block 105, which central bore is enlarged at the upper end of the carriage block 105 to form a cavity 119. The cavity 119, as best seen in FIG. 7, has three bores 121 (only one being visible in FIG. 7) for each receiving a lower magnet 123. The cavity 119 has a groove 125 for non-rotatably receiving an indexing plunger 127 which has its perimeter adapted to the contour of cavity 119 to inhibit relative rotation but to allow axial movement of the plunger 127.

Not visible in FIGS. 6 and 7, but visible in the ghost views of FIGS. 8 and 9, the indexing plunger 127 has bores opening into its bottom surface for receiving upper magnets 129. In this example the lower magnets 123 are positioned with their north poles on top and the upper magnets 129 are positioned with their north poles facing down. In such an orientation, the lower and upper magnets 123, 129 will repulse one another, so that the indexing plunger 127 carries a number of radial indexing formations 131, which cooperate with complementary indexing formation on a lower face of a turning gear, or turning block 133. In this example, the indexing formations 131 provide rotational positions that are 90.degree. apart. The turning block 133 is mounted to the shaft 113 by means of a second transverse pin 135. Spacing between transverse bore in the shaft 113 for receiving the first and second transverse pins 117, 135 is such that the carriage block 105 is snugly and rotatably received between the abutment flange 115 and the turning block 133. Thereby also the indexing plunger 127 is held within the cavity 119 of the carriage block 105 against the repulsive forces of the confronting lower and upper magnets 123, 129. The magnets 123, 129 are preferably identical and sintered rare earth magnets. Such sintered rare earth magnets may contain neodymium or be ceramic magnets of ferrous material. Another suitable magnet material may be samarium cobalt. The polarity of the lower and upper magnets 123, 129 should be properly directed to obtain the repulsive force necessary to bias the indexing formation 131 in engagement with the turning block 133. This can be with the north poles of confronting magnets facing one another, but may also be achieved by having the south poles facing one another. The important aspect is that equal poles of confronting magnets are facing one another. The turning block 133 further has diagonal slots 137 extending diagonally inwardly from each corner of the substantially square contour of the turning block 133.

In FIGS. 8 and 9 a side and a rear elevation of the assembled article support assembly 101 are illustrated as ghost views. Thereby internal parts like the magnets 123, 129, the indexing plunger 127 and the indexing formations 131 are visible as if the carriage block 105 and the turning block 133 were of transparent material. Also best visible in FIGS. 8 and 9 is that the turning block 133 has an upper cut-out 139 along one edge extending between adjacent slots 137, as well as a lower cut-out 141 along another edge that is perpendicular to the one edge.

The purpose of the upper and lower cut-outs will now be described in reference to FIGS. 10 to 13. In FIGS. 10 to 13 several output positions are shown for the article support assembly 101, after having passed a particular aligning, or turning station 143A, 143B, 143C, 143D in a direction of conveyance indicated by arrow 145. The representation of FIGS. 10 to 13 is essentially schematic, and structure that is not directly relevant to a correct understanding of the disclosure is omitted for clarity. Also the article support assembly 101 is shown in a simplified form with the turning block 133 separated in two levels of disks 133A, 133B to better visualize the upper and lower cut-outs 139, 141. Each of the turning stations 143A-143D has opposed left and right hand guiding walls 147, 149. Each right hand guiding wall 149 has a series of openings 151 in a upper and a lower row, each consisting of three openings 151. Each opening 151 is adapted to selectively receive a turning pin 153. As shown in FIG. 10, three turning pins 153 are successively arranged in the upper row of openings 151 of the left hand guiding wall 147. Irrespective of the rotational position of the article support assembly 101 when it enters the turning station 143A, the three successive turning pins 153 in the upper row will always be sufficient to engage as many of the diagonal slots 137 as is necessary to bring the upper cut-out 139 (in level 133A of the turning block) in a position facing the left hand guide rail 147, once it has passed all three turning pins 153.

As shown in FIG. 11, three turning pins 153 are now mounted in the upper row of three opening 151 of the right hand guiding wall 149. This has the effect that article supported assembly 101 will now leave the turning station 143B with the upper cut-out 139 facing the right hand guiding wall 149. This results in a different position of the shackle 103 than that achieved with the turning station 143A of FIG. 10.

In FIG. 12 again a different arrangement of turning station 143C is shown. In this variation the three successive turning pins 153 are positioned in the lower row of opening 151 of the left hand guiding wall 147. The pins 153 now engage the diagonal slots 137 at the lower portion 133B of the turning block. Upon passage of the article support assembly 101 through the turning station 143C in the direction 145 of conveyance, the lower cut-out 141 will emerge from the turning station 143C, facing the left hand guide wall 147.

In a further variation according to FIG. 13, the turning station 143D has the successive turning pins 153 installed on the lower row of openings 151 in the right hand guide wall 149. This results in the lower cut-out 141 of the lower portion 133B of the turning block to emerge from the turning station 143D facing the right hand side wall 149. While one level of turning pins 153 that are 180° apart, using a second level for positioning the turning pins and a second cut-out at 90° from the first cut-out, enables positioning of the article support assembly 101 at predetermined position at 90°.

Accordingly an article support assembly 101 is disclosed that is adapted for movement by a conveyor along a path of conveyance. The article support assembly 101 includes a carriage block 105 of a carriage for engagement by the conveyor and a shackle 103 configured to support an article, and rotatable with respect to the carriage block. A turning block 133 is associated with the shackle 103, and rotation of the turning block with respect to the carriage block 105 causes corresponding rotation of the shackle relative to the carriage block. Yieldable indexing means 123, 127, 129, 131 are operatively arranged between the carriage block 105 and the turning block 133 to define at least a first and a second incremental rotational position for the shackle 103. The yieldable indexing means 123, 127, 129, 131 of the article support assembly 101 are biased into engagement by magnetic repelling forces. A conveyor system for conveying articles along processing stations is adapted to include the article support assembly 101 and comprises a turning station 143A, 143B, 143C, 143D for giving a predetermined rotational position to the shackle 3 with respect to the carriage block 105.

While it has been described in the above example that the indexing plunger 127 and the turning block providing the yieldable indexing means are biased into engagement by magnetic repelling forces, it is alternatively also possible to obtain this bias by attracting magnetic forces. This effect can be obtained by positioning lower magnet in the indexing plunger 127, and accommodating upper magnets in suitable bores in the turning block 133, but with the confronting lower and upper magnets then positioned to have their opposite poles facing one another.

It is thus believed that the operation and construction of the present invention will be apparent from the foregoing description and drawings appended thereto. It will be clear to the skilled person that the invention is not limited to any embodiment herein described and that modifications are possible which should be considered within the scope of the appended claims. Also kinematic inversions are considered inherently disclosed and to be within the scope of the invention. In the claims, any reference signs shall not be construed as limiting the claim. The term 'comprising' and 'including' when used in this description or the appended claims should not be construed in an exclusive or exhaustive sense but rather in an inclusive sense. Thus the expression 'comprising' as used herein does not exclude the presence of other elements or steps in addition to those listed in any claim. Furthermore, the words 'a' and 'an' shall not be construed as limited to 'only one', but instead are used to mean 'at least one', and do not exclude a plurality. Features that are not specifically or explicitly described or claimed may be additionally included in the structure of the invention within its scope. Expressions such as: "means for . . . " should be read as: "component configured for . . . " or "member constructed to . . . " and should be construed to include equivalents for the structures disclosed. The use of expressions like: "critical", "preferred", "especially preferred" etc. is not intended to limit the invention. Additions, deletions, and modifications within the purview of the skilled person may generally be made without departing from the spirit and scope of the invention, as is determined by the claims.

The invention claimed is:

1. A conveyor for moving and positioning objects along a conveyor path, the conveyor including:
   a conveyor rail extending through a predefined conveying path;
   at least one carriage movable along the conveyor rail and including a carriage block;
   a rotatable article support associated with the at least one carriage;
   a turning block associated with the rotatable article support, to allow rotatable movement of the article support relative to the carriage block;
   a yieldable indexing means operatively arranged between the carriage block and the turning block to define at least a first and a second incremental rotational position for the article support, the yieldable indexing means being biased into engagement by magnetic forces; and
   an aligning station for rotating the article support into a predetermined position,
   wherein the turning block has first disk with a first perimeter contour and a second disk with a second perimeter contour, and
   wherein the alignment station has means for selectively engaging at least the second disk in response to movement of the turning block through the aligning station to rotatably align the article support into the predetermined position.

2. A conveyor according to claim 1, wherein the first disk is an upper level disk and the second disk is a lower level disk.

3. A conveyor according to claim 1, wherein the first and second disk are formed as a single unitary element.

4. A conveyor according to claim 1, wherein the aligning station includes a series of first, second and third turning pins arranged in a row that coincides with a level of a plane through the second disk.

5. A conveyor according to claim 4, wherein the aligning station has a first row of openings aligned in a plane through the first disk and a second row of openings aligned in the plane through the second disk, and wherein each of the first and second rows of openings is adapted to receive any one of at least the first, second and third turning pins for engaging the second disk and alternatively a fourth turning pin for engaging the first disk.

6. A conveyor according to claim 1, wherein the first disk has a substantially square perimeter with slots extending diagonally inwardly from each of its four corners, and wherein the second disk has a substantially rectangular perimeter with only two slots extending diagonally inwardly from two of its corners.

7. A conveyor according to claim 1, wherein the aligning station is a turning station and the rotatable article support includes a shackle configured to support an article, with rotation of the turning block with respect to the carriage block causing corresponding rotation of the shackle relative to the carriage block.

8. A conveyor according to claim 7, wherein the turning block has a substantially rectangular perimeter contour with diagonal slots extending radially inwardly from each corner, further includes an upper cut-out along one perimeter edge extending between adjacent slots, and a lower cut-out extending along another perimeter edge that is perpendicular to the one perimeter edge, and wherein the turning station includes a succession of three turning pins positioned to engage a predetermined selection of diagonal slots of the turning block as well as allowing passage of at least one of the upper and lower cut-outs.

9. A conveyor according to claim 8, wherein the turning pins are selectively mountable in upper and lower rows of openings provided in one of a right hand and left hand guide wall.

10. A conveyor according claim 7, wherein it is an animal carcass conveyor for use in a poultry and/or fowl processing line.

11. A conveyor according claim 1, wherein the magnetic forces of the yieldable indexing means are generated by pairs of rare earth magnets aligned parallel to an axis of rotation of the rotatable article support.

12. A conveyor according claim 11, wherein the magnetic forces resist an axial engagement, relative to the axis of rotation, between the aligned pairs of rare earth magnets.

13. A conveyor according claim 11, wherein the magnetic forces resist an axial separation, relative to the axis of rotation, between the aligned pairs of rare earth magnets.

14. A conveyor according claim 11, wherein the magnetic forces resist a tangential separation, relative to the axis of rotation, between the aligned pairs of rare earth magnets.

* * * * *